(12) United States Patent
Park et al.

(10) Patent No.: US 9,090,048 B2
(45) Date of Patent: Jul. 28, 2015

(54) COUNTER ELECTRODE HAVING CARBON MATERIAL LAYER FOR DYE-SENSITIZED PHOTOVOLTAIC CELL AND METHOD OF PREPARING THE SAME

(75) Inventors: Jong-Ku Park, Namyangju (KR); Seung-Yong Lee, Gwacheon (KR); Yeon-Ik Jang, Guri (KR); Pyuck-Pa Choi, Seoul (KR); Dong-Hwan Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 1402 days.

(21) Appl. No.: 11/674,776

(22) Filed: Feb. 14, 2007

(65) Prior Publication Data
US 2008/0087322 A1   Apr. 17, 2008

(30) Foreign Application Priority Data
Oct. 13, 2006   (KR) .......................... 10-2006-0099903

(51) Int. Cl.
*H01L 31/05* (2014.01)
*B32B 37/12* (2006.01)
*H01G 9/20* (2006.01)

(52) U.S. Cl.
CPC .............. *B32B 37/12* (2013.01); *H01G 9/2022* (2013.01); *B32B 2307/202* (2013.01); *B32B 2313/04* (2013.01); *H01G 9/2031* (2013.01); *H01G 9/2059* (2013.01); *Y02E 10/542* (2013.01)

(58) Field of Classification Search
CPC .............. B32B 37/12; B32B 2307/202; B32B 2313/04; H01G 9/2059; H01G 9/2022; H01G 9/2031; Y02E 10/542
USPC ......................................................... 136/263
See application file for complete search history.

(56) References Cited

U.S. PATENT DOCUMENTS

| | | | | |
|---|---|---|---|---|
| 5,391,433 A | * | 2/1995 | Kawakubo et al. | 428/408 |
| 7,297,445 B2 | * | 11/2007 | Nakamura et al. | 429/231.8 |
| 2003/0155004 A1 | * | 8/2003 | Takahashi et al. | 136/263 |
| 2005/0079356 A1 | * | 4/2005 | Rathenow et al. | 428/408 |
| 2005/0263182 A1 | * | 12/2005 | Morooka et al. | 136/263 |

FOREIGN PATENT DOCUMENTS

| | | |
|---|---|---|
| JP | 17-209458 A | 8/2005 |
| KR | 10200595134 | 9/2005 |
| KR | 10-2006-0030574 | 4/2006 |

OTHER PUBLICATIONS

Imoto et al., "High-performance carbon counter electrode for dye-sensitized solar cells", solar energy materials, 2003.*
Lindstrom, "A new method to make dye-sensitized nanocrystalline solar cells at room temperature", Journal of Photochemistry, 2001.*
(Continued)

*Primary Examiner* — Matthew Martin
(74) *Attorney, Agent, or Firm* — NSIP Law (57) ABSTRACT

A counter electrode and a dye-sensitized photovoltaic cell having the counter electrode are provided. The counter electrode includes a conductive substrate, an adhesive layer formed on the conductive substrate, and a porous carbon material layer formed on the adhesive layer.

6 Claims, 4 Drawing Sheets

(56) References Cited

OTHER PUBLICATIONS

Yeon-Ik Jang et al.,Fabrication of dye-sensitized solar cells with a counter electrode of carbon, Extraordinary General Meeting of the Korean Powder Metallurgy Institute 2006 and Information of the Opening of Spring Scientific Lecture Presentation Competition, Apr. 14, 2006, Korea Atomic Enetgy Research Institute, Republic of Korea.

Zohuriaan-Mehr, Mohammad J., et al. "Modified CMC: part1-optimized synthesis of carboxymethyl cellulose-g-polyacrylonitrile." *Iranian Polymer Journal* 14.2 (2005): 131-138.

de Britto, Douglas,et al. "Thermal degradation of carboxymethylcellulose in different salty forms." *Thermochimica Acta* 494.1 (2009): 115-122.

Sadeghi, Mohammad, et al. "Graft Copolymerization Methacrylamide Monomer onto Carboxymethyl Cellulose in Homogeneous Solution and Optimization of Effective Parameters." *World Applied Sciences Journal* 16.1 (2012): 119-125.

* cited by examiner

(Example 1: carbon black)

(Example 4: activated carbon)

(Example 5: graphite)

COUNTER ELECTRODE HAVING CARBON MATERIAL LAYER FOR DYE-SENSITIZED PHOTOVOLTAIC CELL AND METHOD OF PREPARING THE SAME

CROSS REFERENCE TO RELATED APPLICATION

This application claims priority to and the benefit of Korean Patent Application No. 10-2006-0099903 filed on Oct. 13, 2006 filed in the Korean Intellectual Property Office, which is hereby incorporated by reference for all purposes as if fully set forth herein.

BACKGROUND OF THE INVENTION

1. Field of the Invention

The present invention relates to a counter electrode having a porous carbon material layer for a dye-sensitized photovoltaic cell and a method of preparing the same. More particularly, the present invention relates to a counter electrode for a dye-sensitized photovoltaic cell, which has superior durability and high energy-conversion efficiency, and to a method of preparing the counter electrode.

2. Description of Related Art

Generally, a dye-sensitized photovoltaic cell includes a photo-electrode, a counter electrode, and electrolyte. The photo-electrode is generally formed of a transparent conductive oxide substrate in which metal oxide nanoparticles having a wide band gap energy and photosensitive dye are absorbed. The counter electrode is formed of a transparent conductive oxide substrate coated with platinum (Pt).

When the dye-sensitized photovoltaic cell is exposed to sun light, the photosensitive dye absorbing the sun rays is in an excited state and thus transmits electrons to a conduction band of the metal oxide. The conducted electrons move to the electrode and flow to an external circuit to transmit electrical energy to the external circuit. The electrons are subsequently reduced in energy while transmitting the electrical energy to the external circuit and move to the counter electrode, after which the photosensitive dye is supplied with electrons from the counter electrode through the electrolyte, thereby returning to its initial state. At this point, the electrolyte functions to receive the electrons from the counter electrode by an oxidation-reduction reaction and transfer the electrons to the photosensitive dye.

In most cases, the counter electrode is coated with platinum (Pt). Platinum has the advantage of having a high degree of electrical conductivity, and also has a catalytic property (oxidation-reduction reaction). However, platinum is expensive and limited in increasing a surface area where catalysis occurs. Therefore, limitations are encountered with respect to increasing a catalysis speed of the dye-sensitized photovoltaic cell.

Furthermore, when a module of the photovoltaic cell is large in size, expensive equipment such as a large-sized sputtering facility is used to prepare the platinum counter electrode or the counter electrode is prepared through a wet coating method that uses a large amount of platinum compound. This is economically infeasible as manufacturing costs are increased.

In order to solve the above-described drawbacks, studies are being conducted for finding suitable components for the counter electrode that can substitute for platinum.

For example, it has been reported that a carbon material can provide energy-conversion efficiency that is almost identical to that of platinum (M. Gratzel et al., Solar Energy Materials and Solar Cells 44 (1996) pp. 99-117) (K. Imoto et al., Solar Energy Materials and Solar Cells 79 (2003) pp. 459-469). In addition, a photovoltaic cell having a counter electrode coated with a carbon material or formed of a mixture slurry of a carbon material and a binder has been proposed.

However, since the conventional carbon counter electrode is not durable, the performance of the cell is sharply deteriorated when it is used for long periods of time. More particularly, under a situation where the carbon counter electrode is applied with a heat cycle load, the counter electrode may be delaminated or cracked, or carbon powders may float.

In order to enhance the durability of the counter electrode, a method of preparing the counter electrode using carbon powders mixed with binders such as metal oxide particles or metal particles that can be finely dispersed has been proposed (Japanese laid-open patent No. 2005-302390).

However, at this point, there is still a need for a counter electrode that has sufficient durability that is required for use over long periods of time.

SUMMARY OF THE INVENTION

Embodiments of the present invention provide a counter electrode for a dye-sensitized photovoltaic cell, in which the counter electrode has superior durability, high energy-conversion efficiency, and can be manufactured at a low cost.

Embodiments of the present invention also provide a method of preparing the counter electrode for the dye-sensitized photovoltaic cell.

Embodiments of the present invention additionally provide a dye-sensitized photovoltaic cell having the counter electrode.

BRIEF DESCRIPTION OF DRAWINGS

A more complete appreciation of the present invention and many of the attendant features and advantages thereof, will be readily apparent as the present invention becomes better understood by reference to the following detailed description when considered in conjunction with the accompanying drawings in which like reference symbols indicate like components, wherein.

DETAILED DESCRIPTION OF THE EXEMPLARY EMBODIMENTS

In an exemplary embodiment of the present invention, a counter electrode for a dye-sensitized photovoltaic cell includes a conductive substrate, an adhesive layer formed on the conductive substrate, and a porous carbon material layer formed on the adhesive layer.

The adhesive layer may include a polymer resin selected from the group consisting of phenol resin, epoxy resin, ethylene-vinyl acetate copolymer, and a combination thereof.

The porous carbon material layer may include a carbon material selected from the group consisting of carbon black, activated carbon, graphite, and a combination thereof.

In another exemplary embodiment of the present invention, a method of preparing a counter electrode for a dye-sensitized photovoltaic cell includes (i) preparing a conductive substrate for the counter electrode, (ii) forming an adhesive layer on a surface of the conductive substrate, and (iii) forming a porous carbon material layer on the adhesive layer.

The method may further include, after the forming of the adhesive layer, heating the substrate on which the adhesive layer is formed to provide fluidity for the adhesive layer.

The forming of the porous carbon material layer may include applying carbon material powder on the adhesive layer and pressing the applied carbon powder.

The method may further include, after the forming of the porous carbon material layer, heat-treating the counter electrode at a temperature at which a material of the adhesive layer can be thermally dissociated to a carbon material. The heat-treating of the counter electrode may be performed at a temperature of 300-500° C. for 10-60 minutes.

In still another exemplary embodiment of the present invention, a dye-sensitized photovoltaic cell includes a photo-electrode, a counter electrode disposed to face the photo-electrode, and electrolyte filled in a space defined between the photo-electrode and the counter electrode, wherein the counter electrode includes a conductive substrate, an adhesive layer formed on the conductive substrate, and a porous carbon material layer formed on the adhesive layer.

The present invention will now be described more fully with reference to the accompanying drawings, in which exemplary embodiments of the invention are shown. The invention may, however, be embodied in many different forms and should not be construed as being limited to the embodiments set forth herein; rather these embodiments are provided so that this disclosure will be thorough and complete, and will fully convey the concept of the invention to those skilled in the art.

The inventors of the present invention conceived of the present invention after identifying that manufacturing costs are reduced when an adhesive layer and a porous carbon material layer are successively laminated on an electrode substrate for a counter electrode of a dye-sensitized photovoltaic cell as compared with the conventional platinum counter electrode. The inventors of the present invention further determined that when the porous carbon material layer is adhered to the substrate by the adhesive layer, the durability of the counter electrode is further improved as compared with the conventional counter electrode formed by using a carbon-binder mixture slurry, and the energy-conversion efficiency is high due to the porous carbon material layer being sufficiently exposed to the electrolyte.

Therefore, a counter electrode for a dye-sensitized photovoltaic cell according to an exemplary embodiment of the present invention includes a conductive substrate, an adhesive layer formed on the substrate, and a porous carbon material layer formed on the adhesive layer. The following will describe the counter electrode of the present exemplary embodiment in more detail with reference to FIG. 1.

Figure 1:
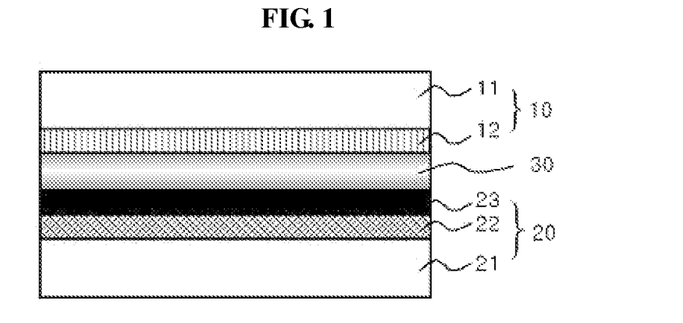
FIG. 1 is a schematic sectional view of a dye-sensitized photovoltaic cell according to an exemplary embodiment of the present invention.

A conductive substrate 21 may be a well-known substrate in the art, preferably a transparent plastic substrate formed of a material including at least one of polyethyleneterephthalate (hereinafter, PET), polyethylenenaphthalate (hereinafter, PEN), polycarbonate (hereinafter, PC), polypropylene (hereinafter, PP), polyimide (hereinafter, PI), and triacetylcellulose (hereinafter, TAC), or a glass substrate coated with a conductive film formed of a material including tin-doped indium oxide (hereinafter, ITO), fluorine-doped tin oxide (hereinafter, FTO), $ZnO\text{—}Ga_2O_3$, $ZnO\text{—}Al_2O_3$, and $SnO_2\text{—}Sb_2O_3$. However, the present invention is not limited to these configurations.

The adhesive layer 22 formed on the substrate 21 functions to allow a porous carbon material layer, which will be described below, to be adhered to the substrate 21. The adhesive layer 22 and the porous carbon material layer are laminated as separate layers.

The adhesive layer 22 may be formed of components that (i) do not affect the performance of the dye-sensitized photovoltaic cell while having a sufficient adhesive force required for adhering the porous carbon material layer to the substrate 21, (ii) more strongly fix carbon particulates of the porous carbon material layer by thermally dissociating the carbon material through a heat treatment process in the manufacturing process of the counter electrode, and (iii) more strongly maintain a combined state between the substrate 21 and the particles of the carbon material. For example, the components of the adhesive layer 22 may include a polymer resin selected from the group consisting of phenol resin, epoxy resin, ethylene-vinyl acetate copolymer, and a combination thereof. However, the present invention is not limited with respect to the components of the adhesive layer 22.

The porous carbon material layer 23 is adhered to the substrate 21 by the adhesive layer 22 to perform electrical conduction and catalysis (oxidation-reduction reaction). The porous carbon material layer 23 is a separate layer from the adhesive layer 22. The porous carbon material layer 23 may include a carbon material that can show the minimum electrical conductivity and catalysis action that is needed for the counter electrode. For example, the porous carbon material layer 23 may include a carbon material selected from the group consisting of carbon black, activated carbon, graphite, and a combination thereof. However, the present invention is not limited in this respect.

As the counter electrode of the dye-sensitized photovoltaic cell is formed having the substrate 21, the adhesive layer 22 formed on the substrate 21, and the porous carbon material layer 23 formed on the adhesive layer 22, the manufacturing cost of the counter electrode can be further reduced as compared with the conventional platinum counter electrode. Particularly, when the porous carbon material layer 23 is adhered to the substrate 21 by the adhesive layer 22, the durability of the counter electrode is further improved as compared with the conventional counter electrode formed by using a carbon-binder mixture slurry and the energy-conversion efficiency is high as the porous carbon material layer 23 is sufficiently exposed to the electrolyte. The durability and energy-conversion efficiency of the dye-sensitized photovoltaic cell will be described in more detail with reference to examples and comparative examples that will be described below.

Meanwhile, a method of preparing the counter electrode for the dye-sensitized photovoltaic cell according to an exemplary embodiment of the present invention includes preparing a conductive substrate for the counter electrode (Step i), forming the adhesive layer on a surface of the conductive substrate (Step ii), and forming the porous carbon material layer on the adhesive layer (Step iii).

Figure 2:
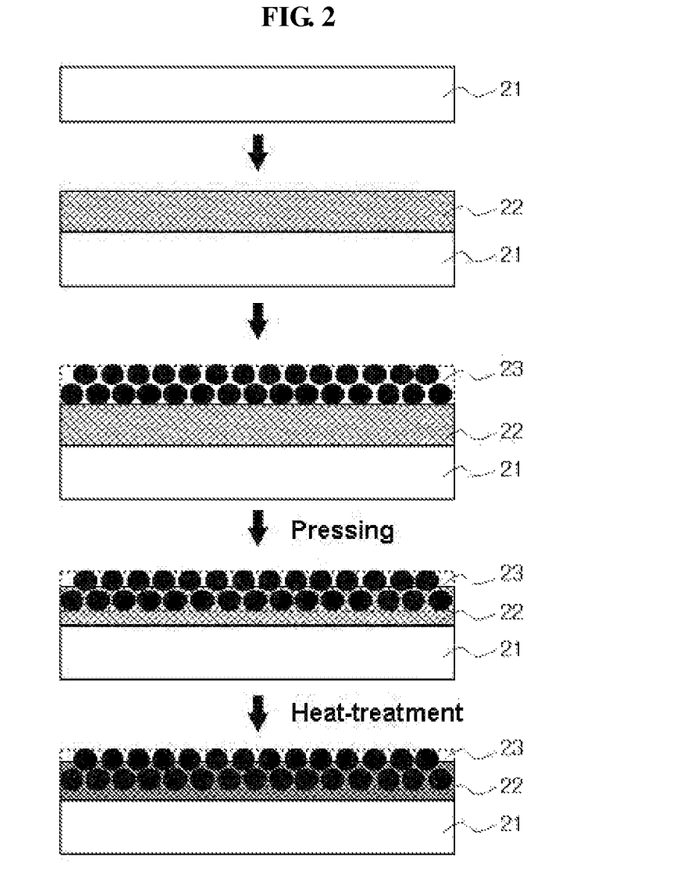
FIG. 2 is a schematic view illustrating a series of processes for preparing a counter electrode for a dye-sensitized photovoltaic cell according to an exemplary embodiment of the present invention.

The following will describe the method of preparing the counter electrode of the exemplary embodiment of the present invention in more detail with reference to FIG. 2.

First, the substrate 21 for the counter electrode is prepared (Step i).

As described above, the conductive substrate 21 may be a well-known substrate in the art, preferably a transparent plastic substrate formed of a material including at least one of PET, PEN, PC, PP, PI, and TAC, or a glass substrate coated with a conductive film formed of a material including ITO, FTO, $ZnO-Ga_2O_3$, $ZnO-Al_2O_3$, and $SnO_2-Sb_2O_3$. However, the present invention is not limited to these configurations.

Next, the adhesive layer 22 is formed on a surface of the substrate 21 for the counter electrode (Step ii). In more detail, masking is performed on a desired electrode area on a conductive surface of the substrate 21 and the adhesive material is coated on the masking area and dried, thereby forming the adhesive layer 22.

The adhesive layer 22 may be formed of components that (i) do not affect the performance of the dye-sensitized photovoltaic cell while having a sufficient adhesive force required for adhering the porous carbon material layer 23 to the substrate 21, (ii) more strongly fix carbon particulates of the porous carbon material layer by thermally dissociating the carbon material through a heat treatment process in the manufacturing process of the counter electrode, and (iii) more strongly maintain a combined state between the substrate 21 and the particles of the carbon material. For example, the components of the adhesive layer 22 may include a polymer resin selected from the group consisting of phenol resin, epoxy resin, ethylene-vinyl acetate copolymer, and a combination thereof. However, the present invention is not limited in this respect.

At this point, in order to coat the adhesive material on the substrate 21, a polymer resin solution, prepared by dissolving a powder-phase polymer resin in an organic solvent such as tetrahydrofuran (THF), may be used. That is, the polymer resin solution may be deposited on the substrate 21 through a doctor blade process and dried. The concentration of the polymer resin solution can be adjusted depending on the required level of adhesive strength. Therefore, the concentration of the polymer resin solution is not limited to a specific level.

Next, the porous carbon material layer 23 is formed on the adhesive layer 22 (Step iii). In more detail, the carbon material may be evenly deposited on the adhesive layer 22 and pressed, thereby forming the porous carbon material layer 23.

The porous carbon material layer 23 may include a carbon material that can show the minimum electric conduction and catalysis action that is needed for the counter electrode. For example, the porous carbon material layer 23 may include a carbon material selected from the group consisting of carbon black, activated carbon, graphite, and a combination thereof. However, the present invention is not limited in this respect.

At this point, in order to allow the porous carbon material layer to be effectively adhered to the adhesive layer 22, a process for heating the substrate 21 may be further performed to make the adhesive layer 22 have liquidity before the porous carbon material layer 23 is formed on the adhesive layer 22. A heating temperature of the substrate 21 on which the adhesive layer 22 is formed may be adjusted to be greater than a softening temperature when the polymer resin is a thermoplastic resin, or to be between the softening temperature and a hardening temperature when the polymer resin is a thermosetting resin. For example, the heating temperature may range from 80° C. to 150° C.

In addition, in order to further enhance the durability of the counter electrode after the porous carbon material layer 23 is formed on the adhesive layer 22 (Step iii), a heat treatment step may be further performed to thermally dissociate the adhesive material to the carbon material.

At this point, in order to reduce cost, the heat treatment step may be performed on the basis of minimal conditions necessary to realize thermal dissociation of the polymer resin of the adhesive layer 22. For example, the counter electrode may be heat-treated at a temperature of 300-500° C. for 60 minutes.

During the heat treatment process after Step iii, the polymer resin of the adhesive layer 22 is thermally dissociated to thereby leave a carbon residue. The carbon residue cannot function as a catalyst by itself. Instead, the carbon residue functions to more strongly fix the carbon particulates of the porous carbon material layer 23 contacting the adhesive layer 22 and to more strongly maintain the combined state between the substrate 21 and the carbon particles, thereby improving the durability of the counter electrode and providing a stable fill factor to the counter electrode.

Therefore, to ensure that the porous carbon material layer 23 is more strongly fixed on the substrate 21 and sufficiently exposed to the electrolyte, it is preferable that the counter electrode is formed through the present method in which the adhesive layer 22 is formed on the substrate 21, the porous carbon material layer 23 is implanted in the adhesive by pressing the carbon material on the adhesive layer 22, and the adhesive layer 22 is thermally dissociated, rather than through the conventional method where a mixture of the binder and the carbon material is used for the counter electrode.

Meanwhile, as shown in FIG. 1, another exemplary embodiment provides a dye-sensitized photovoltaic cell including a photo-electrode 10, a counter electrode 20 facing the photo-electrode 10, and electrolyte 30 filled in a space defined between the photo-electrode 10 and the counter electrode 20, wherein the counter electrode 20 has the above-described structure of the foregoing exemplary embodiment and is prepared by the above-described method.

For simplicity, although only one layer of the electrolyte 30 is illustrated in FIG. 1, the electrolyte 30 is evenly dispersed in a nanoparticle layer 12 that is a porous metal oxide layer at the space defined between the photo-electrode 10 and the counter electrode 20.

A feature of the dye-sensitized photovoltaic cell of the exemplary embodiment of the present invention is to include the counter electrode 20 having the adhesive layer 22 and the porous carbon material layer 23 that are successively laminated on the conductive substrate 21. Therefore, the photo-electrode 10 and the electrolyte 30 may be designed utilizing a structure well known in the art and may be prepared through a method well known in the art. That is, the photo-electrode 10 and the electrolyte 30 are not limited to specific configurations.

For example, the photo-electrode 10 may be formed to include a conductive substrate and a metal oxide nanoparticle layer 12 that is dyed with a photosensitive dye. The electrolyte 30 may be formed of a material that is an iodide/triodide pair that can serve to transfer electrons from the counter electrode 20 to the dye of the photo-electrode 10.

A method of manufacturing the dye-sensitized photovoltaic cell may include disposing the photo-electrode 10 such that the photo-electrode 10 faces the porous carbon material layer 23 of the counter electrode 20 prepared by the above-described method, and filling the electrolyte 30 in the space defined between the photo-electrode 10 and the counter electrode 20.

The following will describe examples of the present invention. The present invention should not be construed as being limited to the following examples set forth herein; rather these examples are provided so that this disclosure will be thorough and complete, and will fully convey the concept of the invention to those skilled in the art.

EXAMPLE 1

Preparation of Counter Electrode

A glass substrate coated with FTO was prepared as a substrate for the counter electrode, and masking was performed at an area of 0.5 cm$^2$ on a conductive surface of the substrate using an adhesive tape. A phenol solution prepared by dissolving 0.1 g phenol resin powders in 1.5 ml tetrahydrofuran solvent was coated on the substrate and dried, thereby forming the adhesive layer.

Figure 3:
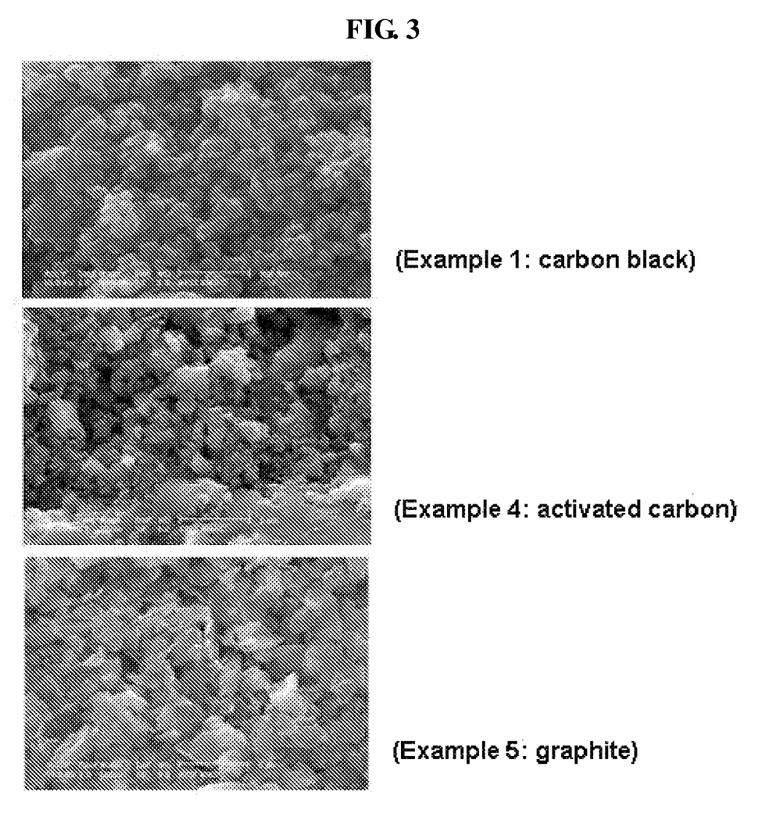
FIG. 3 shows photographs of surfaces of counter electrodes, which are taken by a scanning electron microscope (SEM), according to Examples 1, 4, and 5.

Next, the substrate was disposed on a 100° C. hot plate to provide fluidity for the adhesive layer. Carbon black powders were then applied to the adhesive layer and pressed by a flat plate to allow the carbon black powders to be adhered to the adhesive layer, after which the substrate was heat-treated at a temperature of 400° C. for 30 minutes to allow the material of the adhesive layer to be thermally dissociated, thereby preparing the counter electrode. A surface of the counter electrode was observed using an SEM. Images obtained through such observation are illustrated in FIG. 3.

(Preparation of Photo-Electrode)

A glass substrate coated with FTO was prepared as a substrate for the photo-electrode, and masking was performed at an area of 0.5 cm$^2$ on a conductive surface of the substrate using an adhesive tape. Ti nanoxide HT/SP paste (product of SOLARONIX company) was applied on the substrate at a thickness of 8 μm through a doctor blade process, after which the substrate was sintered at a temperature of 450° C. for 30 minutes. Next, the substrate was immersed in an ethanol solution containing a photosensitive dye (N719, 0.3 mM) for 24 hours so that the dye was absorbed in the substrate, thereby preparing the photo-electrode.

(Injection of Electrolyte and Sealing)

Acetonitrile electrolyte containing LiI (0.5M) and I (0.05M) was injected in a space defined between the counter electrode and the photo-electrode and the space was sealed, thereby preparing the dye-sensitized photovoltaic cell.

EXAMPLES 2 TO 5

In Examples 2 through 5, the dye-sensitized photovoltaic cells were prepared in accordance with a method identical to that of Example 1, except for materials used for the adhesive layers and the porous carbon material layers. The materials used are shown in the following Table 1. Example 4 and 5 was observed the surface state the counter electrode with SEM, and the results are shown in FIG. 3.

TABLE 1

| | Material of Adhesive Layer | Materials of Carbon Material Layer |
|---|---|---|
| Example 1 | Phenol Resin | Carbon Black |
| Example 2 | Epoxy Resin | Carbon Black |
| Example 3 | Ethylene-Vinyl Acetate | Carbon Black |
| Example 4 | Phenol Resin | Activated Carbon |
| Example 5 | Phenol Resin | Graphite |

COMPARATIVE EXAMPLE 1

A dye-sensitized photovoltaic cell was prepared through a method identical to that of Example 1, except that the counter electrode was a platinum (Pt) counter electrode.

The platinum counter electrode was prepared by coating a platinum thin film at a thickness of 10 nm with an ion coater on a glass substrate coated with FTO.

COMPARATIVE EXAMPLE 2

A dye-sensitized photovoltaic cell was prepared through a method identical to that of Example 1, except that the counter electrode was formed using a mixture slurry of carbon powders and a binder.

The mixture slurry of the carbon material powder and the binder resin was prepared by mixing 0.5 g ethylcellulose (molecular weight=10,000) and 1.5 g carbon black powders with 9 ml α-terpineol and milling the same. The counter electrode was prepared by coating the mixture slurry at a thickness of 8 μm on a glass substrate coated with FTO through a doctor blade process and by performing a heat-treating process at a temperature of 400° C. for 30 minutes.

TEST EXAMPLE 1

Measurement of Fill Coefficient and Energy-Conversion Efficiency of Dye-Sensitized Photovoltaic Cell A fill coefficient and energy-conversion efficiency were measured for each of the dye-sensitized photovoltaic cells of Examples 1 through 5 and Comparative Example 1. Measurement results are shown in the following Tables 2-4 and FIGS. 4 through 6.

The energy-conversion efficiency was measured by using a solar simulator of 1.5AM 100 mW/cm$^2$ (the solar simulator includes a Xe lamp [300 W, Oriel], an AM1.5 filter, and a Keithley SMU2400), while the fill coefficient was calculated by using the conversion efficiency obtained through the method and the following equation:

$$\text{Fill Coefficient}(\%) = ((J \times V)_{max}/(J_{sc} \times V_{oc})) \times 100 \quad \text{[Equation]}$$

where J is a value of a Y-axis of a conversion efficiency curve, V is a value of an X-axis of the conversion efficiency curve, and $J_{sc}$ and $V_{oc}$ are intercepts of the Y- and X-axes.

TABLE 2

| | Carbon Material Layer | Adhesive Layer | Fill Coefficient (%) | Conversion Efficiency (%) |
|---|---|---|---|---|
| Example 1 | Carbon Black | Phenol Resin | 60.40 | 4.15 |
| Comparative Example 1 | Platinum (Pt) | — | 63.30 | 4.30 |

Figure 4:
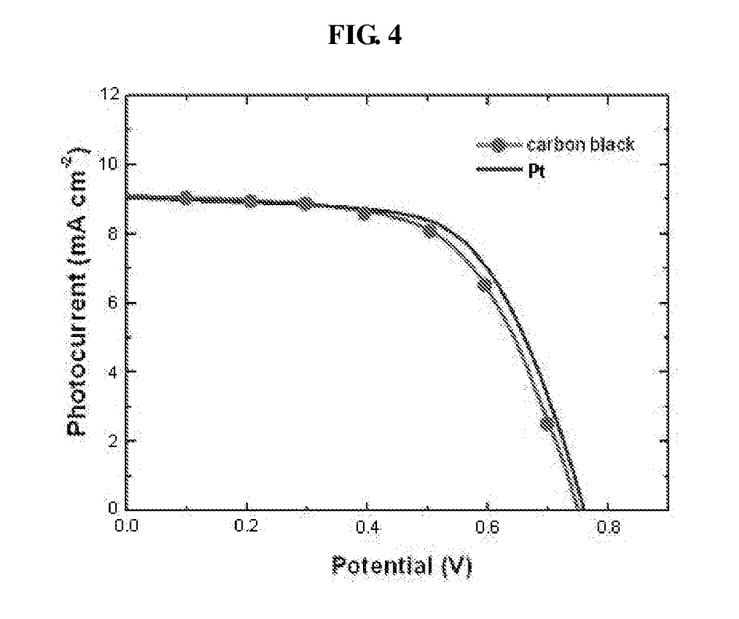
FIG. 4 is a graph illustrating current-voltage properties of dye-sensitized photovoltaic cells according to Example 1 and Comparative Example 1.

As shown in Table 2 and FIG. 4, as the dye-sensitized photovoltaic cell of Example 1 includes the counter electrode having the adhesive layer and the porous carbon material layer, the fill coefficient and energy-conversion efficiency thereof are almost same as those of the photovoltaic cell of Comparative Example 1 (having the platinum counter electrode).

TABLE 3

| | Carbon Material Layer | Adhesive Layer | Fill Coefficient (%) | Conversion Efficiency (%) |
|---|---|---|---|---|
| Example 1 | Carbon Black | Phenol Resin | 61.90 | 4.74 |
| Example 2 | Carbon Black | Epoxy Resin | 63.80 | 4.62 |
| Example 3 | Carbon Black | Ethylene-Vinyl Acetate | 58.80 | 4.18 |

TABLE 4

| | Carbon Material Layer | Adhesive Layer | Fill Coefficient (%) | Conversion Efficiency (%) |
|---|---|---|---|---|
| Example 1 | Carbon Black | Phenol Resin | 58.40 | 3.65 |
| Example 4 | Activated Carbon | Phenol Resin | 67.30 | 3.76 |
| Example 5 | Graphite | Phenol Resin | 43.10 | 2.50 |

Figure 5:
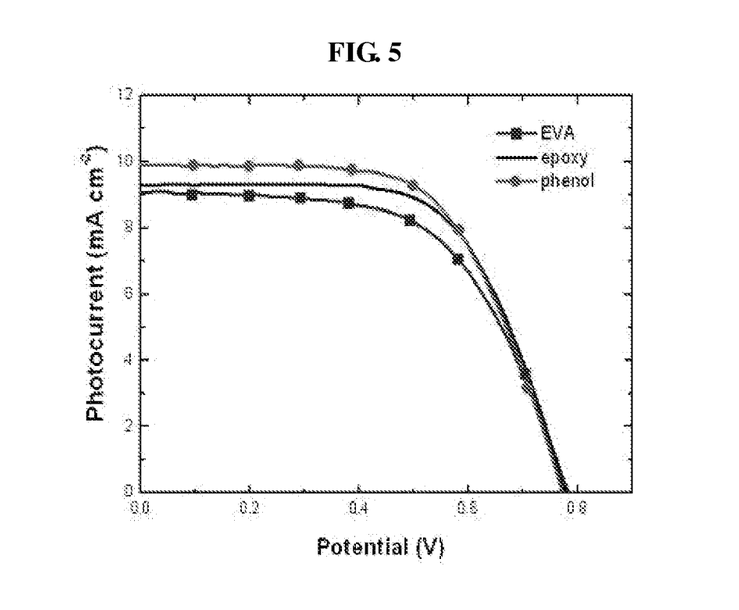
FIG. 5 is a graph illustrating current-voltage properties of dye-sensitized photovoltaic cells according to Examples 1 through 3.
Figure 6:
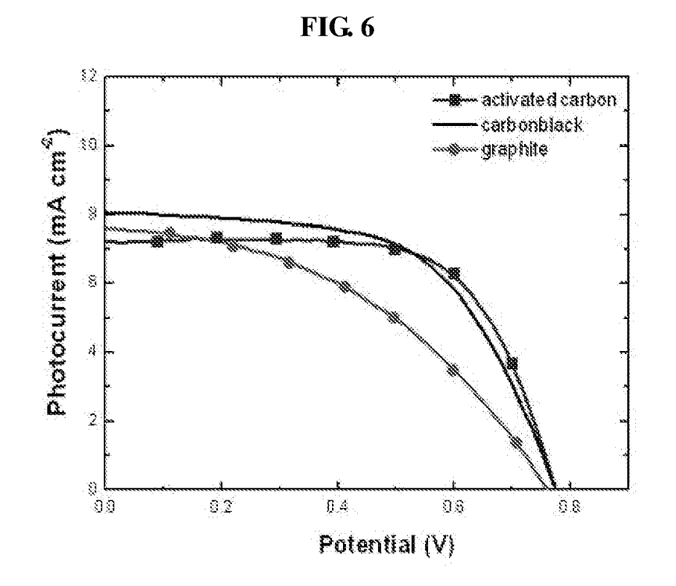
FIG. 6 is a graph illustrating current-voltage properties of dye-sensitized photovoltaic cells according to Examples 1, 4, and 5.

In Tables 2 to 4 and FIGS. 4 to 6, although data of Example 1 do not coincide with each other, this is only a test error, which may have been caused during the repeating of the tests, but each of the data is obtained by performing the measurement under identical conditions.

TEST EXAMPLE 2

Evaluation of Durability of Counter Electrodes

In order to evaluate the durability of the counter electrodes of Example 1 and Comparative Example 2, a degree of delamination of each of the counter electrodes was observed by applying an ultrasonic waves as a mechanical impact for 5 minutes in a state where each of the counter electrodes is dipped in ethanol contained in the ultrasonic washer. The results are illustrated in FIG. 7.

Figure 7:
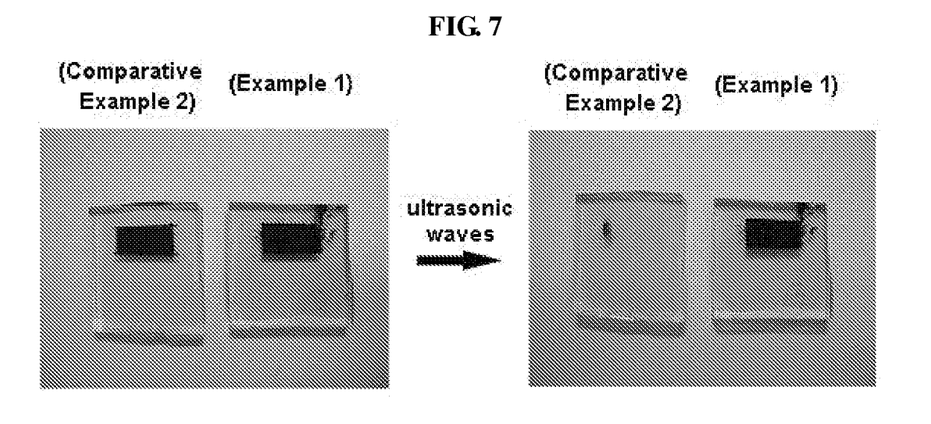
FIG. 7 shows photographs illustrating a durability evaluation result of counter electrodes for dye-sensitized photovoltaic cell according to Example 1 and Comparative Example 2.

As shown in FIG. 7, most of the carbon material of the counter electrode (using the carbon material powders-binder mixture slurry) of Comparative Example 2 was delaminated when the ultrasonic impact was applied thereto. However, the carbon material of the counter electrode of Example 1 was only minimally delaminated. This shows that the counter electrode of Example 1 is superior to that of Comparative Example 2.

As the counter electrode of the dye-sensitized photovoltaic cell according to the exemplary embodiment of the present invention includes the adhesive layer and the porous carbon material layer, the manufacturing costs thereof can be further reduced compared with the platinum counter electrode. Particularly, since the porous carbon material layer is adhered by the separate adhesive layer, the durability of the counter electrode is superior to the conventional counter electrode using the carbon-binder mixture slurry. In addition, between the carbon material particle, and the substrate and carbon material is connected directly, and the electrical conductivity is improved. Furthermore, since the porous carbon material layer having wide surface area is sufficiently exposed to the electrolyte, the energy-conversion efficiency thereof can be improved.

Although exemplary embodiments of the present invention have been described in detail hereinabove, it should be clearly understood that many variations and/or modifications of the basic inventive concept taught herein still fall within the spirit and scope of the present invention, as defined by the appended claims.

What is claimed is:

1. A method of preparing a counter electrode for a dye-sensitized photovoltaic cell, the method comprising:
   preparing a conductive substrate for the counter electrode;
   forming an adhesive layer on a surface of the conductive substrate;
   adhering a porous carbon material layer onto the adhesive layer by applying the porous carbon material powders on the adhesive layer and pressing by flat plate to allow the carbon material to be implanted into the adhesive layer; and
   heat-treating the counter electrode at a temperature at which a material of the adhesive layer can be thermally dissociated to a carbon material to produce a carbon residue which bonds the porous carbon material layer to the adhesive layer,
   further comprising, after the forming of the adhesive layer, heating the substrate on which the adhesive layer is formed to provide fluidity for the adhesive layer,
   wherein the heat-treating of the counter electrode is performed at a temperature of 300-500° C. for 10-60 minutes.

2. The method of claim 1, wherein the adhesive layer comprises a polymer resin selected from the group consisting of phenol resin, epoxy resin, ethylene-vinyl acetate copolymer, and a combination thereof.

3. The method of claim 1, wherein the porous carbon material layer comprises a carbon material selected from the group consisting of carbon black, activated carbon, graphite, and a combination thereof.

4. The method of claim 1, wherein the substrate on which the adhesive layer is formed is heated to a temperature of 80-150° C.

5. The method of claim 1, wherein the forming of the porous carbon material layer comprises applying carbon material powder on the adhesive layer and pressing the applied carbon powder.

6. A method of preparing a counter electrode for a dye-sensitized photovoltaic cell that comprises a photo-electrode and a counter electrode,
   wherein the counter electrode is obtained according to the method of claim 1, wherein the forming of the adhesive layer comprises using a polymer resin selected from the group consisting of phenol resin, epoxy resin, ethylene-vinyl acetate copolymer, and a combination thereof to form the adhesive layer.

* * * * *